United States Patent [19]
Babcock

[11] 3,914,992
[45] Oct. 28, 1975

[54] LOAD MEASURING GAGE

[75] Inventor: Clarence O. Babcock, Lakewood, Colo.

[73] Assignee: The United States of America as represented by the Secretary of Interior, Washington, D.C.

[22] Filed: Aug. 12, 1974

[21] Appl. No.: 496,591

[52] U.S. Cl............. 73/88 F; 73/141 A; 73/DIG. 1; 116/DIG. 34
[51] Int. Cl.[2]........................................ G01L 1/10
[58] Field of Search............ 73/88 F, 88 E, DIG. 1, 73/141 A; 116/DIG. 34; 177/210

[56] References Cited
UNITED STATES PATENTS

| | | | |
|---|---|---|---|
| 2,725,843 | 12/1955 | Koski | 116/DIG. 34 |
| 3,052,116 | 9/1962 | Critchley et al. | 73/88 E |
| 3,242,738 | 3/1966 | Bellier | 73/DIG. 1 |
| 3,675,474 | 7/1972 | Browne et al. | 73/88 E |

*Primary Examiner*—Herbert Goldstein
*Assistant Examiner*—Anthony V. Ciarlante
*Attorney, Agent, or Firm*—Thomas Zack; Donald R. Fraser

[57] ABSTRACT

A load measuring gage with a vibratory wire. In the embodiment preferred for its cost, a single short stressed piano wire is fixed at its ends in a vertical cut out slot in a steel gage body. If accuracy is more important than cost, three of these wires equidistantly spaced in individual vertical slots on a steel gage body may be used in an alternate embodiment. The steel gage body may be in the shape of a hollow cylinder which is made from medium carbon steel tubing. Each of the piano wires employed are tensioned to tens of thousands of pounds per square inch stress and then crimped into slots in the gage body. When in place with a load placed on ends of the gage body, a low voltage readout system can be used to pluck the wires to determine its initial vibratory mode. Should the load be due to a tightened rock bolt, the initial voltage reading can be correlated to the torque placed on the tightened bolt. Subsequent readings made by the readout system can be used to indicate variations from the initial vibration readings and thereby alert observers to changes in the tension on the bolt.

12 Claims, 5 Drawing Figures

LOAD MEASURING GAGE

BACKGROUND OF THE INVENTION

1. Field of the Invention:

A load cell or gage that uses a vibrating wire whose mode of vibration can be read out to indicate the amount of load thereon.

2. Description of the Prior Art:

The use of vibrating wire strain gages per se is old as evidenced by such references as U.S. Pat. No. 3,675,474 to R. D. Browne. My invention employs the same principles of operation but by using a different method of construction is able to construct a compact inexpensive load cell with a very high degree of operational accuracy heretofore unknown. Of particular importance to my invention is the way the wire is held in the slot of the gage body. By making the gage of a lower yield stress material with large wire anchoring surface areas, it is possible to rigidly hold a wire with a much larger material breaking strength when the wire is crimped. This type of load cell may as a result of its compact size be used in locations such as, on a rock bolt in a mine, that the prior art did not allow. Also, the operative environment of this invention is greater than allowed by the prior art because of a recent innovation of a low voltage wire plucking system for which it was specifically designed to be used. For example, readings may safely be made in coal mines having methane gas without an appreciable danger of explosion. This plucking system, commonly owned with this invention by the United States Government, allows a low voltage readout to take place and is entitled "Vibrating Wire Readout Meter." It was invented by William V. Bailey while working as a Creare Incorporated employee on a United States Bureau of Mines contract. Further, details on the operation of this system can be found in the copending U.S. Pat. application having Ser. No. 495,347, filed on Aug. 7, 1974.

SUMMARY OF THE INVENTION

A small load measuring gage that has a gage body having at least one generally vertical slot. In this slot a tensioned wire is rigidly anchored at both of its ends so that it is positioned to run the length of the slot. Vibrations imparted to this wire are noted and correlated to the load on the gage body surface opposite the anchored ends.

The principle object of this invention is an improved vibrating wire gage.

Figure 1:
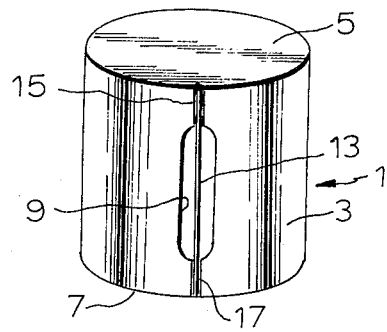
FIG. 1 shows a load cell embodiment with one vibrating wire.

The cylindrical load gage 1 of FIG. 1 has a rigid gage body 3 that has two flattened load bearing surfaces 5 and 7 on opposite ends of the body. Generally vertical slot 9 is cut into the side of the gage body and acts to suspend a vibratory wire 13. Vertically aligned with and contacting this slot are two shallower narrow slots 15 and 17 with one slot being on either end. Wire 13 is anchored at its two ends in these narrow slots so that it may be vibrated therebetween in the wider and deeper slot 9. To use the load cell in the way desired it is preferred that the total length of the wire 13 be between 1 to 2 inches with its vibrating part in slot 9 being about 0.75 of an inch for a 1 inch length wire.

Figure 2:
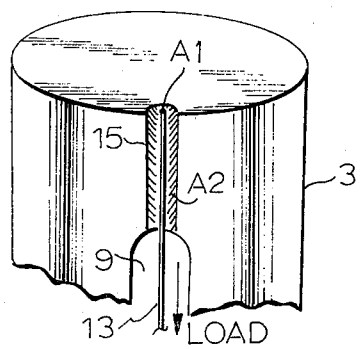
FIG. 2 illustrates how the vibrating wire is anchored at one end within a gage body slot.

It is important to note how the wire 13 is anchored in the narrow anchoring slots 15 and 17. In an actual working embodiment the wire 13 was clamped in the slots by first cutting large slot 9 and the two narrower slots 15 and 17 between 0.010 to 0.012 inches wide in a medium carbon steel tubing that was about 1.25 inches long. Next, a piano wire with a cross-sectional area $A1$ (see FIG. 2) of $636 \times 10^{-7}$ square inches was dead weight loaded under 80,000 pounds per square inch (psi) tension until it hung vertically in the three aligned slots. To anchor the wire, both of the narrow slots 15 and 17 were then closed by a wedge shape tool with a rounded edge about 0.050 inches wide that was pressed perpendicular to the slotted surfaces with a crimping force of between 2,000 to 5,000 pounds. The actual amount of force needed to close these narrow slots and thus provide a firm anchor to the wire depends on the plastic flow stress of the material making up the gage body 3. To illustrate this, suppose the breaking stress of the wire 13 is 400,000 psi and it is to be clamped 0.25 inches at each of the ends. Then the steel gage body with a much lower yield stress (like 36,000 psi) can hold the wire of $636 \times 10^{-7}$ square inches cross-sectional area with 254 pounds of anchoring force on each end. This is possible because the wire comes in contact with 0.007 square inch of tubular anchoring surface $A2$ (see FIG. 2) at each end. By offsetting the larger gage anchoring surface area $A2$ with its lower yield stress, against the much smaller wire surface area $A1$ with its high yield stress it is possible to achieve a holding force on the wire that is 10 times its wire breaking strength. In fact, if the gage body $A2$ is made of carbon steel (as contrasted to mild steel) with a 70,000 psi yield stress this wire holding force can be raised to 20 times the wire breaking strength. The ability to be able to hold a high stress wire with a lower stress anchoring surface is important to my invention since it reduces the cost of construction and size of the gage body. It also insures that the wire will not slip during use and so overcomes one serious problem with vibrating wire gages.

The actual parameters of the frequency of vibration for the wire, wire strength, wire length, wire diameter, slot dimensions, and strength of the gage body may, of course, vary. Generally, it can be expected that this invention will operate within a vibratory frequency range between 2,000 to about 7,000 hertzs. Typically, the wire is piano wire that can withstand about 400,000 psi stress and is about 0.009 inches in diameter with a vibratory length of about 0.75 of an inch.

Figure 3:
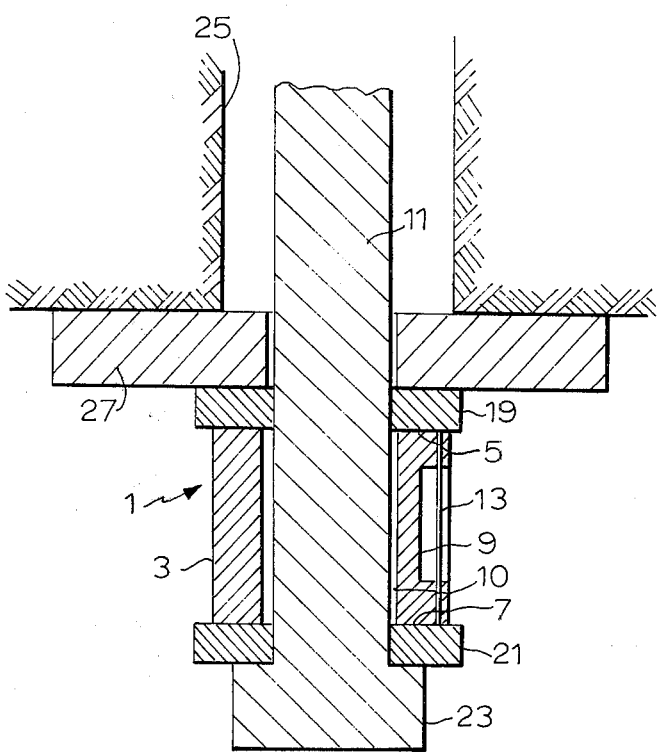
FIG. 3 is a cross-sectional view of a gage like in FIG. 1 but with a central cylindrical hole positioned on an in situ rock bolt. This is the preferred embodiment.

FIG. 3 illustrates a cross-sectional view of one of the major potential uses of the invention. In fact, it was for use with a rock bolt that the invention was primarily developed. The gage 1 of FIG. 3 is exactly the same as that of FIG. 1 except that it has a central bore 10 to accommodate the shaft 11 of the rock bolt. Corresponding parts in the FIG. 3 embodiment have the same numbers as those in FIG. 1. Two flattened annular washer plates 19 and 21 encircle the same rock bolt shaft and are positioned on opposite ends of the gage to engage its flat end surfaces 5 and 7, respectively. Washer plate 19 may be a spherical washer to insure that the gage body is loaded axially for more accurate results. A surface bearing plate 27 and a tightened bolt 23 complete the system so that an expandable upper anchor (not shown) several feet up in borehole 25 may rigidly hold the bolt and gage to the mine roof. As bolt 23 is tightened by a torque wrench, plates 19 and 21 compress the gage body therebetween. If a measurement of the vibratory frequency of wire 13 is made when the bolt 23 is tightened to its desired torque by the readout system previously mentioned variations can be noted at subsequent times to alert observers to changes of the gage load. Hence, should there be rock shifts or other variations in the earth that cause the rock bolt tightness to vary, the knowledge of their occurrence can be detected.

Figure 4:
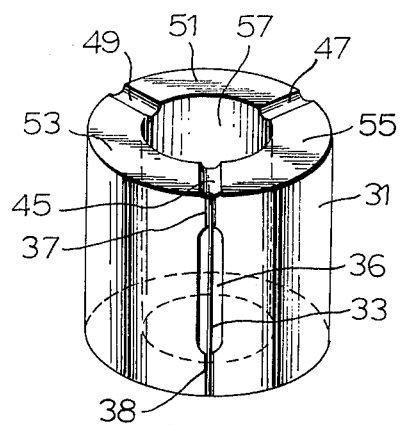
FIG. 4 is a perspective view of an alternate embodiment of the FIG. 3 gage.
Figure 5:
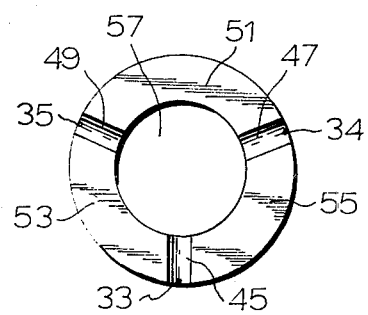
FIG. 5 is a top view of the FIG. 4 embodiment.

FIGS. 4 and 5 illustrate two views of another embodiment of the FIG. 3 load gage. The basic difference between this second embodiment and the FIG. 3 embodiment is that in FIG. 4 three equidistantly spaced vibrating wires are used. As such it is more accurate in its load measurement and more expensive and complicated to construct. The three identical vertical wires 33, 34, and 35 are parallel to each other and spaced about 120° apart when viewed from the top as in FIG. 5. Like FIG. 1, each wire has its own large vertical slot in which it vibrates which is located between two narrower aligned vertical slots. These three slots (two narrow and one large) for each wire are in turn parallel to the three slots for the other two wires. As each is identical only one wire system will be described with respect to wire 33, it being understood the others are the same. The slot 36 has the vibrating segment of the wire whereas crimped slots 37 and 38 act to anchor its end. Typically the slot 36 is about 1/16 of an inch in depth and does not extend through the tubular wall.

Concave semicircular indentations about 1/16 of an inch in radius and 0.040 inch deep may be placed over the upper and/or lower surfaces directly over the narrow slots that anchor each of the wires. Three of these indentations are shown in FIG. 4 and designated by the numbers 45, 47, and 49. The purpose of the indentation, is to prevent the direct application of the load on the wire terminals and thereby weaken the anchoring mounts. The bearing surface areas 51, 53, and 55 between the indentations (FIG. 4) receive the load applied to the gage.

If it is desired to mount the embodiment of FIG. 4 on a rock bolt or other load bearing device having a shaft, a central hole 57 running the entire length of the gage body 31 may be used. In the event such an arrangement is used (like in the embodiments of FIGS. 3 and 4), the depth of the slots can be about 1/16 of an inch when the gage body wall thickness is about 3/16 of an inch. Other types of mounting holes or devices are, of course, possible or the gage can simply have solid flattened surfaces at both ends as in the FIG. 1 embodiment.

Whether the FIG. 3 embodiment with its one vibrating wire or the FIG. 4 embodiment with its tripod loading arrangement is used depends on whether cost or accuracy of readings is the major consideration. Clearly from a pure cost point of view the one wire system is less expensive and easier to construct and read out than the FIG. 4 three wire system. However, it may not give a completely accurate reading if the load is not uniformly distributed over the end areas of the gage. Use of a spherical washer for washer plate 19 will insure such loading. The FIG. 4 embodiment is preferred when accuracy is paramount to cost as its triangular or tripod loading arrangement allows the load to be distributed over three transmitting areas and gives a better averaged reading than a single wire alone.

Other modifications to the FIGS. 3 and 4 embodiments may be needed when the load does not act vertically on the load bearing vibrating wire surfaces as in a crooked bolt installation. One variation is suggested. This is to use a spherical washer on one or both ends of the gage in place of the flattened washers. Other situations using the one wire system described can also be improved by using two flattened washers made of mild steel that deform before the gage body. In this latter case, the washers acting as load limiters are first deformed before reference readings are taken. Then loosened and readings taken. Lastly the bolt is retorques with more reference readings taken.

Preferably the load should be acting directly on the load bearing surface above or near the anchor point and be not greater than 5° off from true vertical. If it is within this preferred range, preliminary tests indicate with a mild steel gage body a change in loading force of 25 pounds can be measured and the force acting on the gage can be up to 8,000 pounds. When a medium carbon steel body (stress yield around 70,000 psi) is used, maximum loads of 20,000 pounds can be obtained with a change in loading force of 32 pounds.

Other variations to what has been described are also possible. The important thing is to create a low cost, simple, small, safe, sensitive, stiff gage which is unaffected to a large degree by the time it is in place or the effects of temperature, moisture or dust normally found in an operative environment. This invention, to be measured only by the claims that follow, accomplishes all of these desired features.

I claim:

1. A small vibratory wire load measuring gage for use as a load cell comprising:
   a rigid gage body having at least one generally vertical slot in its outer side and an upper and lower load bearing body surface; and
   a wire made of material having a high yield stress tensioned in said slot extending in the same direction as the slot and being anchored only by the gage body material at its ends in two narrow body anchor slots located on opposite ends of said vertical slot.

2. The gage of claim 1 wherein said gage body is made of a material having less than half the yield stress of the wire.

3. The gage of claim 1 wherein the gage anchors the wire by crimping its ends in said narrow slots that are forced shut under pressure.

4. The gage of claim 1 wherein a central mounting hole extends through the gage body for mounting a load receiving apparatus.

5. The gage of claim 1 wherein there are three equidistantly spaced slots with each slot having its own tensioned wire.

6. The gage of claim 1 wherein the yield stress of said wire is over 100,000 pounds per square inch and said wire is tensioned to greater than 10,000 pounds per square inch.

7. The gage of claim 1 wherein said gage body is made of steel and is less than 2 inches in overall length.

8. The gage of claim 7 wherein there are three equidistantly spaced vertical slots and a vertical wire tensioned by over 10,000 pounds per square inch in each slot.

9. The gage of claim 1 wherein said gage body is cylindrical in shape with a central aperture extending the length of said body, and a plurality of said vertical slots are equidistantly spaced in and around the periphery of said body with their vertical directions being parallel to said aperture.

10. A combined measuring gage and rock bolt comprising:

an elongated rock bolt with an earth engaging anchor one end and a bolt tensioning means on the other end;

a load gage through which said rock bolt can inserted, said gage having a rigid gage body with a plurality of generally vertically slots in its outer side surface; and a vibratory tensioned wire anchored in each vertical slo only by the gage body material at its opposite ends and extending in the same direction as each vertical slot.

11. The combination of claim 10 wherein each of said wires is anchored in said gage body by crimping the material of the gage body near the ends of the wire.

12. The combination of claim 10 wherein each of said wires has a vibratory length less than 1 inch and is under a tension of at least 10,000 pounds per square inch.

* * * * *